US008576836B2

(12) United States Patent
Bottiero

(10) Patent No.: US 8,576,836 B2
(45) Date of Patent: Nov. 5, 2013

(54) METHOD FOR HANDLING UNANSWERED CALLS

(75) Inventor: Bruno Bottiero, Turin (IT)

(73) Assignee: Telecom Italia S.p.A., Milan (IT)

( * ) Notice: Subject to any disclaimer, the term of this patent is extended or adjusted under 35 U.S.C. 154(b) by 361 days.

(21) Appl. No.: 12/226,741

(22) PCT Filed: Apr. 28, 2006

(86) PCT No.: PCT/EP2006/003946
§ 371 (c)(1),
(2), (4) Date: Jan. 7, 2009

(87) PCT Pub. No.: WO2007/124763
PCT Pub. Date: Nov. 8, 2007

(65) Prior Publication Data
US 2009/0290574 A1    Nov. 26, 2009

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl.
USPC ............ 370/352; 370/252; 370/329; 455/414

(58) Field of Classification Search
USPC .......... 370/241–252, 329–352; 455/412–567; 379/201–211; 709/217–229
See application file for complete search history.

(56) References Cited

U.S. PATENT DOCUMENTS

| 6,795,541 | B2 | | 9/2004 | Oren | |
|---|---|---|---|---|---|
| 7,123,697 | B2 | * | 10/2006 | Amir et al. | 379/88.17 |
| 7,519,042 | B2 | * | 4/2009 | Gorday et al. | 370/347 |
| 8,068,815 | B2 | * | 11/2011 | Lakkala | 455/412.2 |
| 2001/0031633 | A1 | * | 10/2001 | Tuomela et al. | 455/417 |
| 2003/0174815 | A1 | * | 9/2003 | Didcock et al. | 379/88.13 |
| 2004/0190498 | A1 | * | 9/2004 | Kallio et al. | 370/352 |
| 2005/0058075 | A1 | | 3/2005 | Gorday et al. | |
| 2008/0208993 | A1 | * | 8/2008 | Skog | 709/206 |
| 2008/0304438 | A1 | * | 12/2008 | Stille | 370/328 |
| 2009/0175265 | A1 | * | 7/2009 | Lindgren | 370/352 |
| 2009/0303943 | A1 | * | 12/2009 | Vikberg et al. | 370/329 |
| 2010/0220604 | A1 | * | 9/2010 | Skog et al. | 370/252 |
| 2011/0124362 | A1 | * | 5/2011 | Wakasa et al. | 455/511 |

FOREIGN PATENT DOCUMENTS

EP    1 345 397 A1    9/2003
WO    WO 2004/056137 A1    7/2004

OTHER PUBLICATIONS

Rosenberg, et al., "SIP: Session Initiation Protocol", Network Working Group, Request for Comments 3261, Standards Track, pp. 1-269, (Jun. 2002).

(Continued)

*Primary Examiner* — Man Phan
(74) *Attorney, Agent, or Firm* — Finnegan, Henderson, Farabow, Garrett & Dunner, L.L.P.

(57) ABSTRACT

Reliable and interactive communication between parties is allowed even in those cases in which an incoming call cannot be answered due to inconvenience, inopportunity and/or impoliteness, e.g., during an important meeting, a conference or a ceremony. A packet-switched connection between the called party and the calling party is established in response to an action intended for terminating an incoming call performed at the called party's terminal.

16 Claims, 4 Drawing Sheets

(56) References Cited

OTHER PUBLICATIONS

3GPP TS 24.228 V5.1.0, 3$^{rd}$ Generation Partnership Project; Technical Specification Group Core Network; Signaling Flows for the IP Multimedia Call Control Based on SIP and SDP; Stage 3 (Release 5); GSM, pp. 1-779, (Jun. 2002).

3GPP TS 24.229 V5.1.0, 3$^{rd}$ Generation Partnership Project; Technical Specification Group Core Network; IP Multimedia Call Control Protocol Base on SIP and SDP; Stage 3 (Release 5); GSM, pp. 1-207, (Jun. 2002).

* cited by examiner

METHOD FOR HANDLING UNANSWERED CALLS

CROSS REFERENCE TO RELATED APPLICATION

This application is a national phase application based on PCT/EP2006/003946, filed Apr. 28, 2006.

TECHNICAL FIELD OF THE INVENTION

The present invention generally relates to the field of telecommunications. More particularly, the present invention relates to a method for handling an unanswered call, such as, for example, an incoming call entering at a user's terminal which is not accepted by the called user. The present invention also relates to a program being adapted to be executed by a processing device, the program being adapted, once executed, to perform the above method. The present invention also relates to a user terminal (e.g. a mobile telephone) configured for performing the above method.

BACKGROUND OF THE INVENTION

Telephone calls allow to achieve an intended object of putting at least two parties, namely a calling and a called party, into communication with each other. In particular, the large spread of wireless terminals (e.g. cellular telephones) has strongly improved the possibility of communication between parties.

The communication between parties is now being further improving by new services made available on last generation telephones in addition to the traditional voice call service, such as instant messaging and presence services. For example, WO 2004/056137 discloses a mobile telephone terminal that provides a user with a selectable option to transfer a telephone call to an instant messaging session and to transfer an instant messaging session to a telephone call.

However, the above stated object of putting two parties into communications with each other is often not achieved for many different reasons. For example, the called party could be already engaged into telephone communication with another party, so that the calling person receives at its telephone terminal a "busy" tone; as another example, the telephone call to the called party could be unanswered because the called party is not available, e.g. since she/he is attending a meeting, or is far from the ringing terminal, etc.

Sometimes, it may happen that a called party cannot answer the call due to a current context in which answering to a telephone call may be inconvenient, inopportune and/or impolite (e.g. during a conference, or an important meeting, or a ceremony, etc.). In such cases, the called user may leave the call unanswered, or he/she may refuse the call, e.g., by pressing a suitable key of the telephone (hard key or soft key).

Usually, a voice mailbox can be associated with the called party, so that the calling party may leave a voice message, in case the called user is busy or does not answer the call.

Some cellular telephones allow definition of a default short message to be sent to the caller, in case a call cannot be answered. The sending (and possibly the adjustment of the text) of the short message can be activated by a suitable key (or series of keys) made available as option by the software of the called party's telephone.

U.S. Pat. No. 6,795,541 discloses a method for completing a call when a called party has not answered the call from a calling party, by detecting a signal indicating that the called party has not answered the call and terminating the call. A message is presented to the calling party that indicates the called party has not answered the call and prompts the calling party to compose a multimedia message to be delivered to the called party. The multimedia message is then sent to a multimedia messaging service server ("MMS Server") for subsequent delivery to the called party whenever the calling party completes composition of the multimedia message.

US 2001/0031633 discloses a method for use in a wireless communications system for performing a context-based call answering function. More particularly, in the '633 patent application a method is disclosed for processing an incoming call, including the steps of (a) storing a current context for the user; (b) in response to an incoming call to the user, determining if an automatic call answering function is enabled and, if so; (c) transferring information to the caller that is descriptive of the current context of the user, without ringing the user's phone. The current context can be determined by a sensor and/or by input from the user, and may be stored in the user's phone equipment or in a Wireless Application Protocol (WAP) server. The step of transferring information includes a step of transferring a voice message to the caller, or a text message (e.g. an SMS message) to the caller, or an animation to the caller, or an identification of an animation that is stored in the caller's phone equipment. The step of transferring information can also comprise a step of transferring a page from the WAP server to the caller. In this case a further step of the method uses the caller's phone equipment to interact with the transferred page for directing further call processing. For example, the further call processing can include one of leaving a message for the user, or causing the call to be put through for ringing the user's phone.

SUMMARY OF THE INVENTION

Telephone calls are often made for a fast communication, e.g. for dealing with emergency. In such cases, unanswered calls may result in lack of important information exchange, up to possibly causing dangerous situations.

The use of short message (e.g. SMS, MMS) for communicating with the calling party may be disadvantageous in such cases, since typically these messages are delivered by following a so-called store-and-forward mechanism, in which the message is first stored in a queue and then sent to the recipient. Strong delays can be implied by the store-and-forward mechanism, as well as loss of the message due to lack of space in the storing queue. In case of MMS, a further action is required to the recipient, i.e. the download of the MMS message stored in a MMS service server, causing further delay. Moreover, communication interactivity may be further reduced due to the fact that several actions should be performed on the parties' terminals in order to open and reply to the messages.

There is thus the need of allowing prompt, reliable and interactive communication between parties even in those cases in which an incoming call cannot be answered due to inconvenience, inopportunity and/or impoliteness, e.g., during an important meeting, a conference or a ceremony.

The Applicant has found that this problem can be solved by establishing a packet-switched connection between the called party and the calling party in response to an action intended for terminating an incoming call performed at a called party's terminal. The establishment of a packet-switched connection between the called and the calling party allows a strong flexibility in terms of usable communication media. In particular, the effectiveness of the communication (particularly in terms of speed) can be strongly improved by establishing a peer-topeer connection between the called party and the calling party (the terms "called" and "calling" refer to the original, terminated call).

In a first aspect, the invention relates to a method for handling an incoming call at a called party's terminal, the incoming call being originated by a calling party's terminal. The method comprises:

receiving a first signal indicative of the incoming call;
detecting a predetermined action of the called party on the called party's terminal corresponding to a refusal of the incoming call;
in response to the detection of said predetermined action, terminating the incoming call and sending a second signal;
wherein the second signal is adapted for allowing establishment of a packet-switched connection between the called party's terminal and the calling party's terminal.

In a second aspect, the invention relates to a program being adapted to be executed by a processing device, the program comprising at least one module being adapted to perform, once executed, the steps of the method of the first aspect.

In a third aspect, the invention relates to a user terminal being configured for performing the method of the first aspect.

Further features and advantages of the present invention will be made apparent by the following detailed description of preferred embodiments thereof, provided merely by way of non-limitative example, which will be conducted with reference to the attached drawings.

DETAILED DESCRIPTION OF PREFERRED EMBODIMENTS OF THE INVENTION

Figure 1:
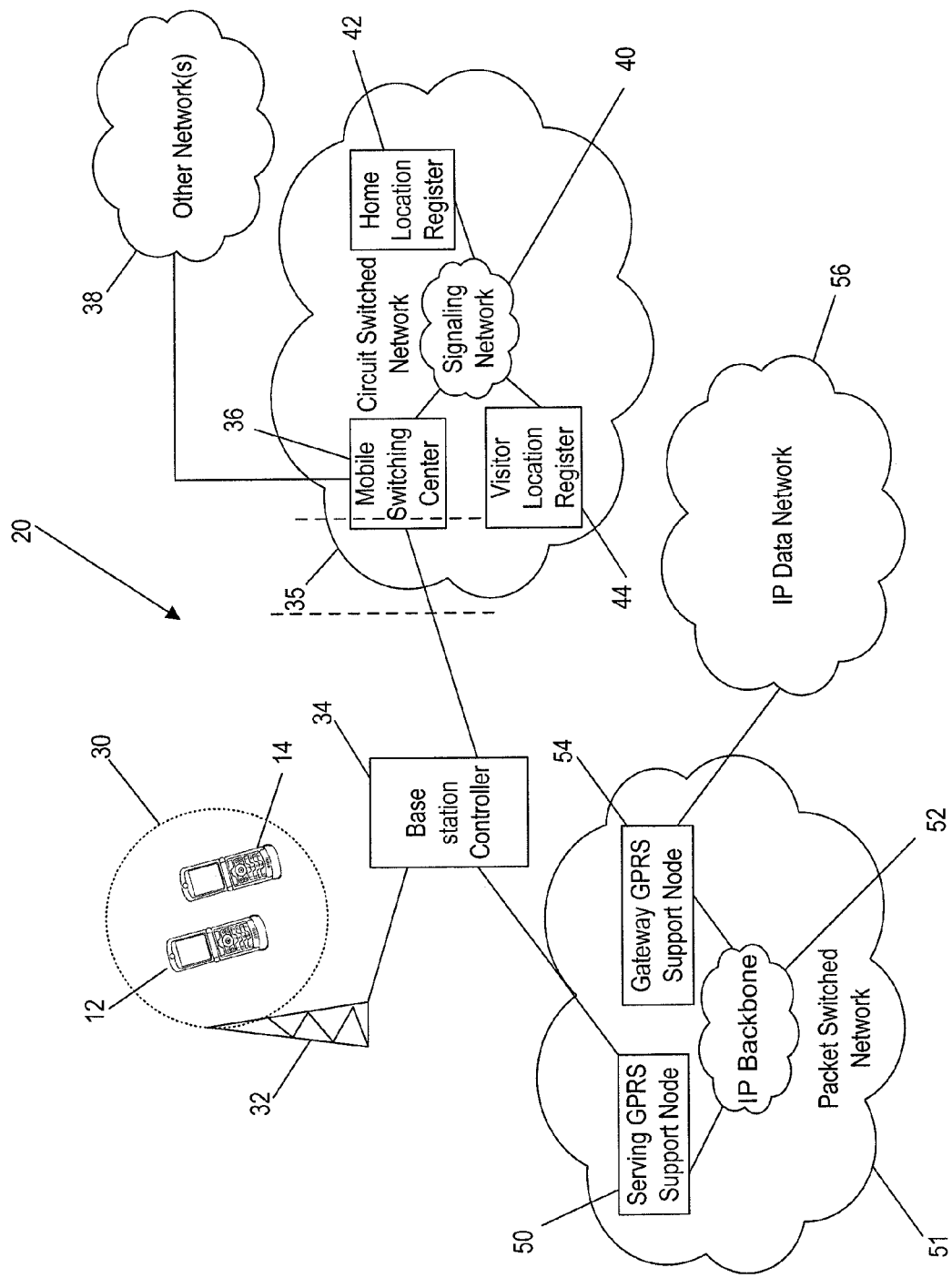
FIG. 1 schematically shows an exemplary UMTS network being adapted to carry out a communication method according to an aspect of the present invention.

The communication method according to an aspect of the present invention can be carried out in any telecommunications network at least comprising a packet-switched domain and being able to sustain a voice communication between network users. Voice communication could be sustained exploiting circuit-switched connections, packet-switched connections, or both. The packet-switched domain of the telecommunications network should be configured so as to allow establishment of packet-switched connections between network users. Packet-switched connections could be typically established through IP (Internet Protocol), e.g. through any suitable protocol of the TCP (Transmission Control Protocol) and/or UDP (User Datagram Protocol) families. However, use of IP protocol should not be considered as limiting the invention: any other packet-based protocol (e.g. Bluetooth) could be conveniently used for the establishment of packet-switched connections, either exploiting wired or wireless bearers, or combinations thereof.

In preferred embodiments, the packet-switched domain of the telecommunications network supports SIP (Session Initiation Protocol) signaling. The telecommunications network may preferably comprise an IMS (IP Multimedia Subsystem) infrastructure.

For example, a suitable telecommunications network could be a wireline telecommunications network, i.e. a network in which user's terminals are plugged to the network through fixed connections, such as, e.g., copper or optical cables. User terminals have processing capability and could be telephonic equipment, or computers comprising software and/or hardware being configured for mimicking telephonic equipment. In any case, user terminals should be able to sustain both a voice communication (e.g., through a circuit-switched connection) and a connection to the packet-switched domain of the network (not necessarily active at the same time). Exemplary connections to a packet-switched domain in wireline networks comprise xDSL connections and/or fiber optic connections.

However, it is noticed that the method according to an aspect of the present invention is particularly suited for being used in a wireless telecommunications network, i.e. a network serving user terminals reachable through over-the-air connections. Exemplary suitable wireless networks comprise GSM/GPRS mobile networks, UMTS mobile networks, WiFi/WiMax networks. User terminals could comprise telephonic equipment (e.g. mobile telephones), PDAs (Personal Digital Assistants), and/or personal computers connected to the wireless telecommunications network through suitable wireless devices (e.g. wireless cards). In any case, user terminals should be able to sustain both a voice communication (e.g., through a circuit-switched connection) and a connection to the packet-switched domain of the network (not necessarily active at the same time).

In the following, for purely exemplary and non-limiting description purposes, reference will be made to a mobile communications network.

Figure 2:
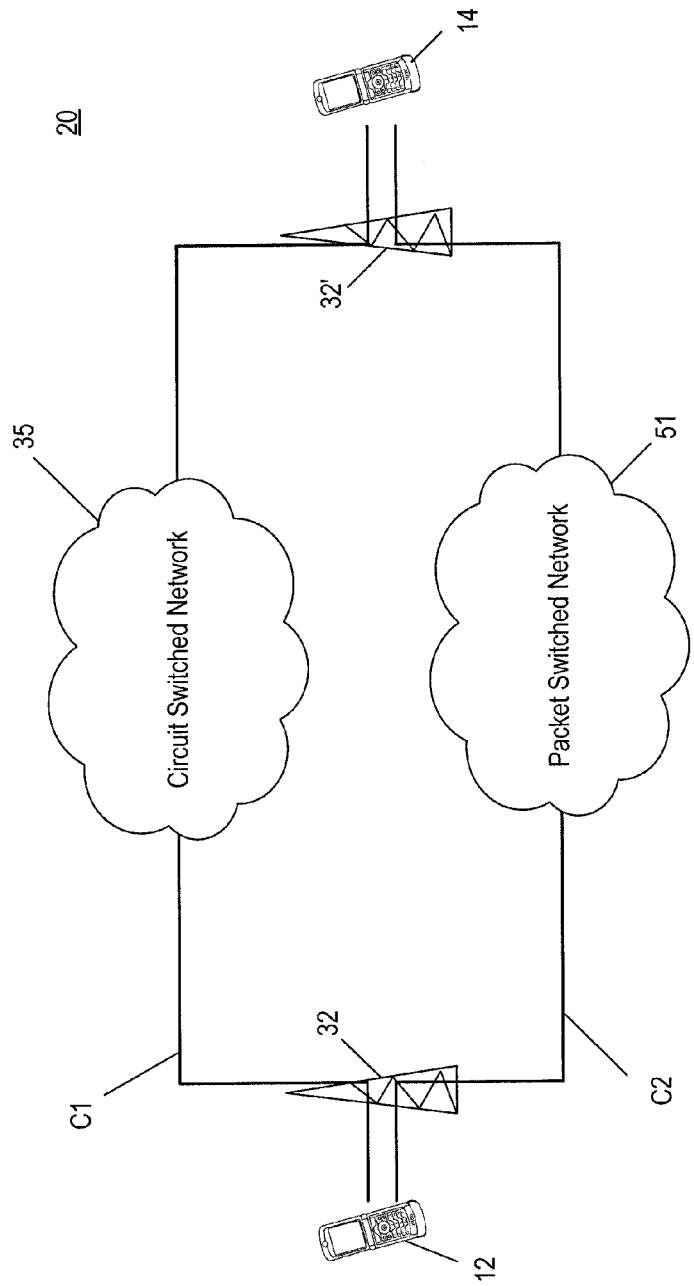
FIG. 2 schematically shows how a communication method according to an aspect of the present invention could be implemented.

More particularly, FIG. 1 shows an exemplary mobile communications network 20, providing mobile telephony services according to the UMTS standard. It is noticed that a mobile network providing mobile telephony services according to the GSM/GPRS standard has a very similar structure to the mobile network of FIG. 1. The mobile network 20 supports both circuit-switched and packet-switched communications, and includes a circuit-switched network 35 and a packet-switched network 51. Mobile stations 12, 14 (e.g. cellular telephones, personal digital assistants, etc.) communicate over a radio interface with one or more base transmitter stations (BTSs) 32, or node-Bs. Each base transmitter station 32 provides service in a corresponding geographical area 30, generally known as cell. It is understood that the mobile network 20 provides service to a number of cells and to a number of mobile stations much higher than those shown for exemplary purposes in FIG. 1. Multiple base transmitter stations 32 are connected to a base station (or radio network) controller (BSC, or RNC) 34, which manages the allocation and de-allocation of radio resources and controls handovers of mobile stations from one base transmitter station to another. A base station controller and its associated base transmitter stations may be referred to as a base station subsystem (BSS). The BSC 34 is connected to a mobile switching center (MSC) 36 in the circuit-switched network 35, through which circuit-switched connections are set up within the network 20 and/or with other networks 38, such as a Public Switched Telephone Network (PSTN), Integrated Services Digital Network (ISDN), etc. In a widespread network, a plurality of BSCs, such as the BSC 34 shown in FIG. 2, is connected to a single MSC, and the network includes a plurality of MSCs.

The generic MSC 36 is also connected via a signaling network 40 (e.g. a Signaling System Number 7, or SS7, network) to a Home Location Register (HLR) 42, and to a Visitor Location Register (VLR) 44. The VLR 44 includes a database containing information about all the mobile stations currently located in a corresponding location or service area, including subscriber information (typically temporary subscriber information) needed by the MSC to provide services in the circuit-switched network 35 to the mobile stations in its service area. Typically, when a mobile station enters a service area, the corresponding VLR 44 requests and receives data about the mobile station from the mobile's HLR and stores the same. As a result, when the visiting mobile station is involved in a call, the VLR 44 already has the information needed for call setup.

The HLR 42 comprises a database that stores and manages subscriptions of the users of the mobile network 20, such as the users owning the mobile stations 12, 14. For each "home" mobile subscriber, the HLR contains permanent subscriber data, such as the mobile station ISDN number (MSISDN), which uniquely identifies the mobile telephone subscription in the PSTN numbering plan, and an international mobile subscriber identity (IMSI), which is a unique identity allocated to each subscriber and used for signaling in the mobile networks. All network-related subscriber information is related to the IMSI. The HLR 42 also contains, in a so-called "profile", a list of services which a mobile subscriber is authorized to use along with a current subscriber location number corresponding to the address of the VLR currently serving the mobile subscriber.

Each BSC 34 also connects to the packet-switched network 51 at a Serving GPRS Support Node (SGSN) 50, responsible for the delivery of packets to the mobile stations within its service area. In a widespread network, a plurality of BSCs, such as the BSC 34 of FIG. 2, is connected to a single SGSN. Multiple SGSNs can be present in the network. At least one gateway GPRS support node (GGSN) 54 acts as a logical interface to "external" data packet networks such as the IP data network 56. The term "external" has to be understood as meaning a general purpose data network providing IP services (e.g. the Internet, or a company's Intranet, or local area network), being "external" with respect to the equipment needed for providing mobile telephony services to the mobile stations 12, 14. SGSN nodes 50 and GGSN nodes 54 are connected with each other by an IP backbone 52.

The exemplary mobile network 20 of FIG. 1 supports a communication method according to an aspect of the invention, the implementation of which is schematically shown in FIG. 2. With reference to FIG. 2, a first user owning the first mobile station 12 places a voice call to a second user owning the second mobile station 14. The first mobile station 12 is camping under a BTS 32, and the second mobile station 14 is camping under a BTS 32', which may be the same BTS under which the first mobile station is camping or a different one.

According to the example shown in FIG. 2, the voice call is intended to be established as a circuit-switched connection, so that it is managed by the circuit-switched network 35 of the mobile network 20 by a first bidirectional connection C1. In particular, the connection C1 can be first established as a signaling channel between the calling mobile station 12 and the called mobile station 14: signaling messages (e.g. SS7 signaling messages) are exchanged between the calling and the called mobile stations on the established signaling channel, in order to properly establish also a voice channel for the call. Among such signaling messages, an incoming call signaling message is delivered to the called mobile station 14, to signal the same of the incoming call being placed by mobile station 12. The incoming call signaling message carries an identifier of the calling mobile station 12, such as a telephone directory number, or another identifier associated with the calling user (e.g. a SIP Uniform Resource Identifier, or URI). An alert (e.g. a ringing tone, and/or a vibration, and/or a flashing of the display) is typically triggered on the called mobile station 14 by the reception of the incoming call signaling message, to inform the called party owning the mobile station 14 of the incoming call.

Let's suppose that the called party cannot answer the incoming call. For example, the called party is attending an important meeting, during which telephone conversations are inconvenient, impolite or even banned. Usually, in such cases, the called party does not answer the call, or even refuses the call by pressing a key (soft key or hard key) on its mobile station for terminating the call. The signaling channel established between the calling mobile station 12 and the called mobile station 14 is then closed.

According to the present invention, the action of terminating the incoming call (without answering the call), or, in other words, the action of closing the established connection C1, is associated with the establishment of another connection C2 between the called party mobile station 14 and the calling party mobile station 12. The connection C2 is established as a packet-switched connection, i.e. it is established by exploiting the packet-switched domain 51 of the mobile network. Preferably, in order to speed up communication, the packet-switched connection C2 is established as a peer-to-peer connection between the two terminals 12, 14. In an alternative embodiment, mediation can be performed by at least one server in the network (e.g. one or more Instant Messaging servers). On the established connection C2, the called party and the calling party can exchange information without talking: for example, text messages could be exchanged between the called party and the calling party on the established packet-switched connection C2. This could be advantageous especially in those cases the calling party only needs fast communication, such as, e.g., in case of emergency or in case of need of few information from the called party.

The following could be an exemplary text dialogue between the called party and the calling party (the terms "called party" and "calling party" refer to the original call) after establishment of the packet-switched connection C2:

Called Party: "In a meeting. Is it urgent?"
Calling Party: "Sorry but I have to send the report: who are the recipients?"
Called Party: "Boss"
Calling Party: "Others?"
Called Party: "No"
Calling Party: "Ok thanks. Bye".

Figure 3:
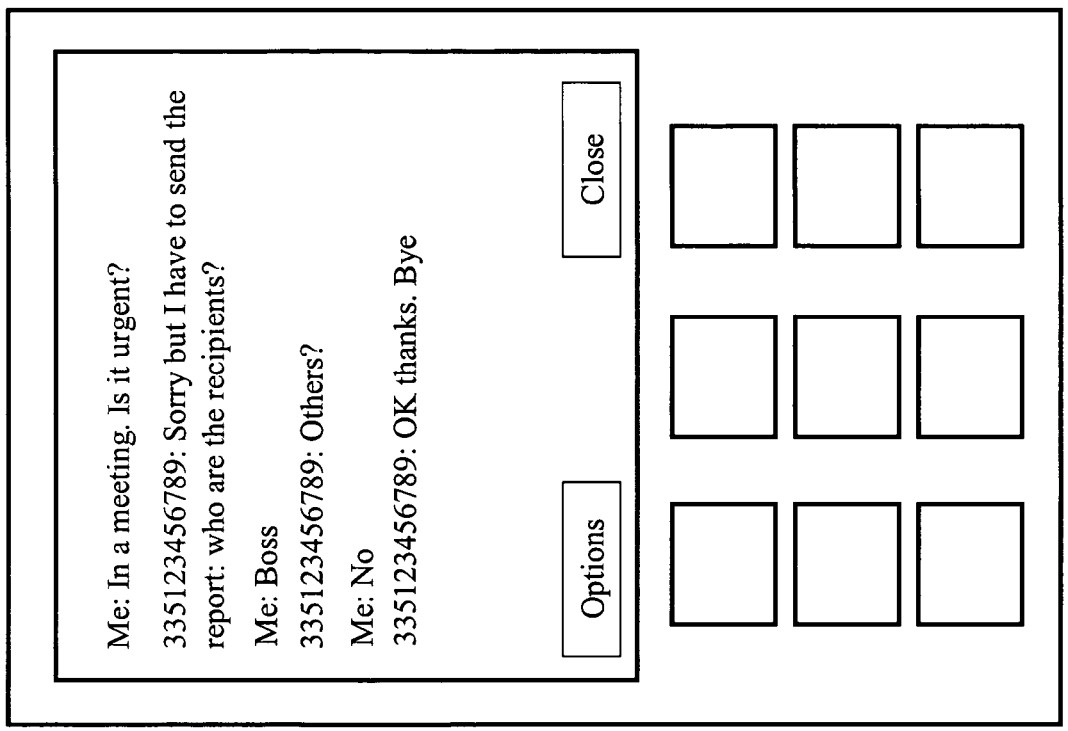
FIG. 3 schematically shows a communication terminal allowing a text dialogue between a called and a calling party according to an example of the present invention.

A suitable software module installed on the terminals may help the users in order to manage the information exchange between the called and the calling party. For example, the software module may activate on the users' terminals a user interface, such as a dialogue window similar to a chat window, as shown in FIG. 3, when the packet-switched connection C2 is established, so as to allow text communication between the called and the calling party.

Preferred embodiments of the invention may provide that the triggering of the establishment of the packet-switched connection C2 at the called party's terminal be performed based on an action of the called party on a terminal's key different from the usual key corresponding to the closing of an active call. In such manner, the called party could have the choice of terminating an incoming call without answering, as usual, or of starting the establishment of the packet-switched connection C2 for communication with the calling party, based on the termination of the incoming call, as disclosed above. For example, the triggering of the establishment of the packet-switched connection C2 could be made available as a menu option (soft key) on the called party's terminal screen receiving the incoming call signaling, the menu option being selectable by, e.g., a suitable key on the terminal keyboard. Alternatively or in addition, the triggering of the establishment of the packet-switched connection C2 could be associated to a "shortcut key" on the called party's terminal keyboard, such as, e.g., the key "5".

During the communication on the packet-switched connection C2, different options could be made available to the parties, in order to help the information exchange between them. For example, access to the contact list, and/or to the file system, and/or to associated/incorporated devices (e.g., a videocamera) could be made available to the parties. Generally, any kind of information, in any form (such as text, video, image, etc.), could be exchanged between the parties on the connection C2: however, it is noticed that communication in text form should be a preferred (e.g. default) choice made available to the parties by the user interface installed on their terminal.

As said above, in preferred embodiments the packet-switched connection C2 between the called party and the calling party is established as a peer-to-peer connection. In order to establish the peer-to-peer connection, the called party and the calling party mutually exchange the packet-switched network addresses assigned to the respective terminals: such network addresses may be IP addresses. Furthermore, a communication port is typically negotiated between the peers. The exchange of the information needed to establish the peer-to-peer connection could be based on signaling messages exchanged between the parties' terminals. For example, signaling messages according to the SIP protocol could be exploited for such purpose.

Once the packet-switched connection C2 is established, information to be exchanged between the parties for communication is encapsulated in packets having a header comprising the address of the other party and a payload comprising the information to be exchanged. For example, in a peer-to-peer IP connection, the packets sent from a party have headers comprising the IP address of the other party and the communication port negotiated between the parties.

The connection to the packet-switched domain 51 of the parties' terminals 12, 14 could be already active when the voice call originated from the calling user is placed. Alternatively, connection to the packet-switched domain 51 of the network could be initiated by the placing of the call at the calling party's terminal, and by the reception of the incoming call signaling at the called party's terminal. Exact procedures for connection to the packet-switched domain 51 of the network depend on the used technology. For example, in a mobile network such as that shown in FIG. 1, connection to the packet-switched domain 51 may comprise opening of a PDP (Packet Data Protocol) context towards a GGSN 54, with assignment of network resources also at the SGSN 50, BSC 34 and BTS 32 level.

Registration to a sub-system of the network could also be required. For example, in case of presence of an IMS infrastructure a registration of the parties' terminals at some IMS core equipment is performed. As another example, an IM (Instant Messaging) infrastructure could also support communication on packet-switched connections between registered users. Registration to such sub-systems by the parties' terminals 12, 14 could be already active when the voice call originated from the calling user is placed. Alternatively, registration could be initiated by the placing of the call at the calling party's terminal, and by the reception of the incoming call signaling at the called party's terminal.

Figure 4:
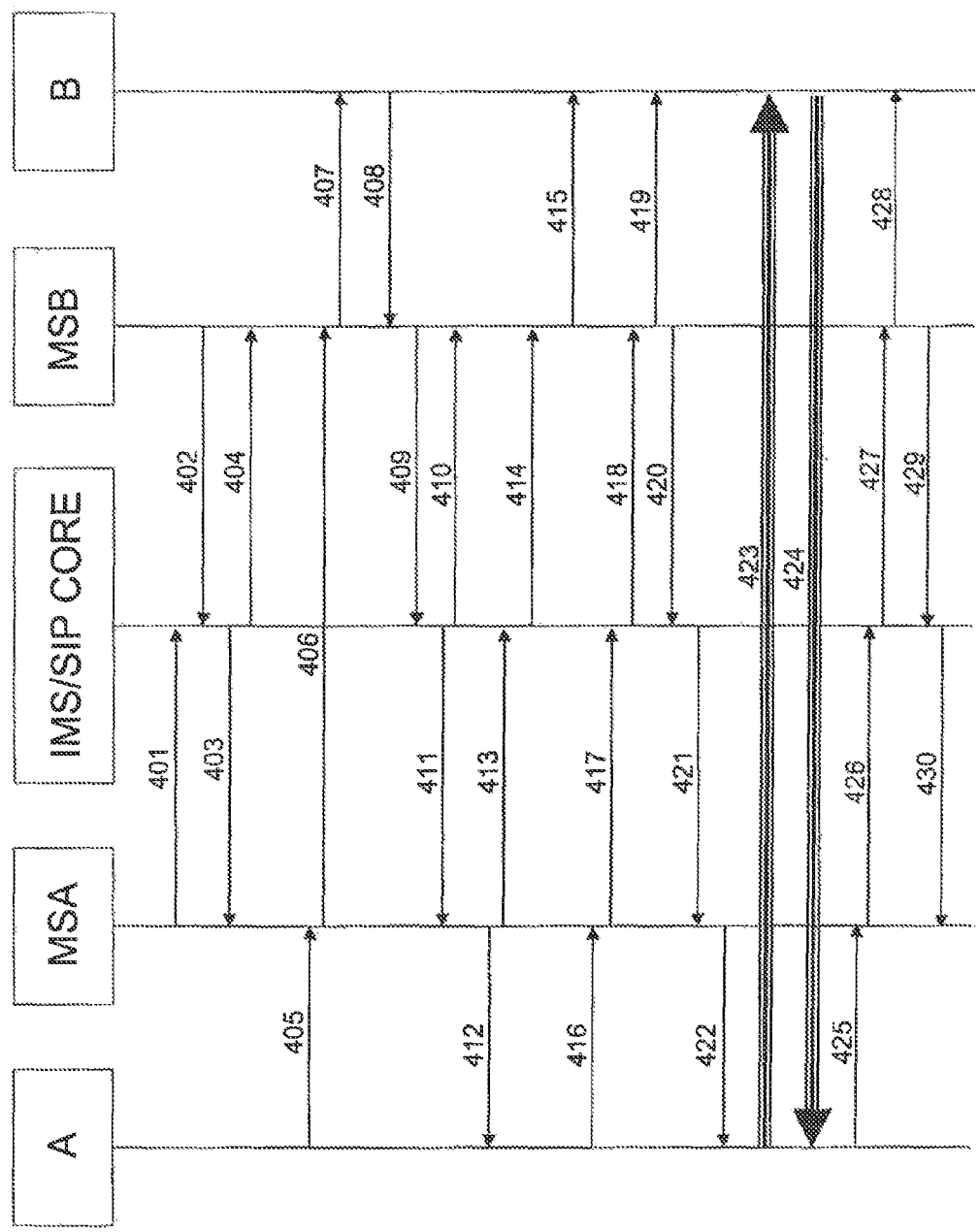
FIG. 4 shows an exemplary procedure for establishing a packet-switched connection between a called party and a calling party according to an embodiment of the present invention.

In the following, an exemplary procedure for establishing a packet-switched connection between a called party and a calling party in response to a termination of a call placed by the calling party to the called party will be described with reference to FIG. 4. In particular, in FIG. 4 calling party is identified as "A" and called party is identified as "B"; user A has a terminal "MSA" and user B has a terminal "MSB". A block "IMS/SIP CORE" identifies an IMS infrastructure being present in the network serving the users A, B, supporting SIP signaling messages. The IMS/SIP infrastructure is not described in detail since well known in the art. For the purposes of the present invention, the role of the IMS/SIP infrastructure is sufficiently represented by the IMS/SIP CORE block shown in FIG. 4. In FIG. 4 it is also assumed that user terminals MSA, MSB support SIP signaling messages. Moreover, it is also assumed that both terminals MSA and MSB are already connected to the packet-switched domain of the network and have a respective IP address.

In the example shown in FIG. 4, the terminals MSA and MSB initially send a registration message at the IMS infrastructure (401, 402), e.g. a SIP REGISTER message. This can be performed, e.g., when the terminals MSA and MSB are switched-on. The IMS/SIP core equipment acknowledges the registration messages (403, 404), if the credentials presented by the users A, B are validated.

The user A places a call directed to user B. This is represented in FIG. 4 by an action of user A on its terminal MSA (405), such as, e.g., the choice of the telephone number of user B from a contact list, followed by a command suited for placing the call. One or more signaling messages are conventionally routed towards the terminal MSB of user B (406), for signaling the incoming call (the exact type and form incoming call signaling message(s) is not critical for the present invention, and will not be described in detail). The incoming call signaling message(s) comprise(s) an identifier of the calling party A (e.g. its telephone number). An alert (407) is presented by the terminal MSB to user B (e.g. a ringing tone, a vibration, a flashing of the display).

The user B cannot answer the call by talking with user A, and presses a predetermined key on its terminal MSB (408) for refusing the call: the pressing of the predetermined key triggers termination of the incoming call and generates a SIP INVITE message addressed to user A (409), for inviting the calling party A to a communication session on a packet-switched connection. The address used in the SIP INVITE message is composed by using the identifier of user A received with the incoming call signaling message(s) (406). The SIP INVITE message (409) comprises one or more parameters specifying the type of the session to be managed (e.g. a text session, and/or file sharing session, and/or image sharing session, and/or video sharing session). Tuning parameters for each type of session may also be comprised in the SIP INVITE message (409).

The SIP INVITE message (409) is sent to the communication network (by exploiting the connection of terminal MSB to the packet-switched network domain) and managed by the IMS/SIP CORE equipment. The IMS/SIP CORE equipment typically operates address resolution for finding the IP address associated with the address specified in the SIP INVITE message (409), i.e. the IP address associated with the terminal MSA of the calling party A. A SIP 100 TRYING message (410) may be sent back to terminal MSB of the called party B for informing the same that the SIP INVITE message (409) was correctly received by the network and that the inviting request is under processing. Once the address specified in the SIP INVITE message (409) is solved, the same is routed towards the terminal MSA (411). An alert (412) is presented by the terminal MSA to user A at the reception of the SIP INVITE message (411) (e.g. a request of acceptation/refusal of the inviting session). A SIP 180 RINGING message (413) may be sent back from terminal MSA towards terminal MSB. After address resolution of user B, the SIP 180 RINGING message is routed from the IMS/SIP CORE equipment to terminal MSB (414). An informing message (e.g. "session in progress . . . ") can be presented on the display of terminal MSB (415) at the reception of the SIP 180 RINGING message (414).

If the user A refuses the inviting session, a SIP 603 DECLINE message is sent back towards terminal MSB (not shown in FIG. 4), and the packet-switched connection between terminal MSA and MSB is not established.

On the contrary, if the user A accepts the inviting session, e.g. by pressing a suitable key on its terminal MSA (416), a SIP 200 OK positive acknowledge message is sent back from terminal MSA towards terminal MSB (417). After address resolution, the SIP 200 OK message is routed from the IMS/SIP CORE equipment to the terminal MSB (418). At the reception of the SIP 200 OK message, the terminal MSB may present to user B an interface (e.g. a graphical user interface) for managing the dialogue with user A (419). A SIP ACK message, acknowledging reception of the SIP 200 OK message (418), is also sent back towards terminal MSA (420). After address resolution, the SIP ACK message is routed from the IMS/SIP CORE equipment to terminal MSA (421). At the reception of the SIP ACK message, the terminal MSA may present to user A an interface (e.g. a graphical user interface) for managing the dialogue with user B (422). The packet-switched connection between terminals MSA and MSB is thus established. In particular, the packet-switched connection is established as a peer-to-peer session, since the signaling messages exchanged by the terminals MSA and MSB for establishing the connection enable exchange of the related IP addresses and definition of a communication port for the dialogue between the two terminals.

By exploiting the established packet-switched connection, the two parties A and B can exchange information with each other (423, 424), as explained above. For example, the interface made available on the respective terminals MSA and MSB could allow exchange of short text messages, as explained above with reference to FIG. 3.

For stopping the communication on the established packet-switched connection, one of the two users, e.g. user A, acts (425) on its respective terminal (e.g. by pressing a suitable key). This action triggers the sending of a SIP BYE message (426), which is routed, after address resolution, by the IMS/SIP CORE equipment to terminal MSB (427). An alert (428) may be displayed to user B at the reception of the SIP BYE message, for informing her/him of the closing of the packet-switched connection. A SIP ACK message is also sent by terminal MSB (429), which is finally routed, after address resolution, from the IMS/SIP CORE equipment to the terminal MSA (430).

The procedure described above by making reference to FIG. 4 follows, as far as the signaling for establishing the packet-switched connection is concerned, the requirements of the IETF standard RFC 3261. It is understood that other procedures could be adapted to the purpose of establishing a packet-switched connection between the two parties A and B, such as, e.g. the procedure disclosed in the 3GPP specifications TS 24.228 and/or TS 24.229.

It is further noticed that the above description makes reference to exemplary cases in which an identifier of the calling party (or of the calling party's terminal) is included in the incoming call signaling message(s) received by the called party's terminal. This has not to be considered as limiting the invention. Procedures could be implemented at the network level (for example, at an application server of an IMS infrastructure) for recovering an identifier associated with the calling party in those cases the incoming call signaling message(s) received by the called party's terminal does not carry a calling party's identifier. An exemplary procedure could provide that the establishment of the packet-switched connection between the called party's terminal and the calling party's terminal be firstly managed by an application server receiving a predetermined signaling message from the called party's terminal (in response to the action intended for refusing the incoming call). The reception of the predetermined signaling message may trigger recovering of an identifier associated with the calling party's terminal by the application server, for example by interrogation of network equipment being able to recover the last voice call routed to the called party. After recovering of the calling party's identifier, the procedure of sending the signaling message to the calling party's terminal intended for the establishment of the packet-switched connection could be performed either by the application server itself (e.g. by forwarding the signaling message received by the called party's terminal to the called party's terminal), or by the called party's terminal after receiving of the calling party's identifier from the application server.

The invention claimed is:

1. A method for handling an incoming call at a called party's terminal, the incoming call being originated by a calling party's terminal, comprising:
    receiving a first signal indicative of the incoming call;
    detecting a predetermined action of the called party on the called party's terminal corresponding to a refusal of the incoming call;
    in response to the detection of said predetermined action, terminating the incoming call, by the called party's terminal, and sending, by the called party's terminal, a second signal to the calling party's terminal, wherein the second signal carries a network address of the called party's terminal so as to allow establishment of a packet-switched connection between the called party's terminal and the calling party's terminal;
    receiving a third signal from the calling party's terminal, the third signal being indicative of an acceptance of the establishment of the packet-switched connection by the calling party; and
    in response to the reception of said third signal, starting a user interface which allows communication between the called party and the calling party via the established packet-switched connection.

2. The method of claim 1, wherein said predetermined action comprises pressing a predetermined key on the called party's terminal.

3. The method of claim 1, wherein said second signal further carries a communication port defined on the called party's terminal.

4. The method of claim 1, wherein said network address of the called party's terminal comprises an internet protocol address of the called party's terminal.

5. The method of claim 1, wherein said third signal carries a network address of the calling party's terminal.

6. The method of claim 5, wherein said third signal further carries a communication port defined on the calling party's terminal.

7. The method of claim 5, wherein said network address of the calling party's terminal comprises an internet protocol address of the calling party's terminal.

8. The method of claim 1, wherein said user interface allows text communication between the called party and the calling party.

9. The method of claim 1, wherein said incoming call is a circuit-switched call.

10. The method of claim 1, wherein the first signal carries an identifier of the calling party's terminal.

11. The method of claim 10, wherein said identifier comprises a telephone directory number associated with said calling party's terminal.

12. The method of claim 10, wherein said identifier comprises a session initiation protocol uniform resource identifier associated with said calling party's terminal.

13. The method claim 10, wherein the addressing of the second signal to the calling party's terminal is performed by exploiting said identifier.

14. A user terminal configured for performing a method for handling an incoming call at a called party's terminal, the incoming call being originated by a calling party's terminal, the method comprising:

receiving a first signal indicative of the incoming call;

detecting a predetermined action of the called party on the called party's terminal corresponding to a refusal of the incoming call;

in response to the detection of said predetermined action, terminating the incoming call, by the called party's terminal, and sending, by the called party's terminal, a second signal to the calling party's terminal, wherein the second signal carries a network address of the called party's terminal so as to allow establishment of a packet-switched connection between the called party's terminal and the calling party's terminal;

receiving a third signal from the calling party's terminal, the third signal being indicative of an acceptance of the establishment of the packet-switched connection by the calling party; and in response to the reception of said third signal, starting a user interface which allows communication between the called party and the calling party via the established packet-switched connection.

15. The user terminal of claim 14, comprising telephonic equipment.

16. The user terminal of claim 15, wherein said telephonic equipment comprises a mobile phone.

\* \* \* \* \*